(12) United States Patent
Lin

(10) Patent No.: US 10,114,962 B2
(45) Date of Patent: Oct. 30, 2018

(54) GENERATING A STUB FILE CORRESPONDING TO A CLASSIFIED DATA FILE

(71) Applicant: Alibaba Group Holding Limited, George Town (KY)

(72) Inventor: Changxiong Lin, Hangzhou (CN)

(73) Assignee: Alibaba Group Holding Limited (KY)

( * ) Notice: Subject to any disclaimer, the term of this patent is extended or adjusted under 35 U.S.C. 154(b) by 160 days.

(21) Appl. No.: 15/158,423

(22) Filed: May 18, 2016

(65) Prior Publication Data

US 2016/0357978 A1 Dec. 8, 2016

(30) Foreign Application Priority Data

Jun. 2, 2015 (CN) .......................... 2015 1 0295401

(51) Int. Cl.
| | |
|---|---|
| *H04L 29/00* | (2006.01) |
| *G06F 21/62* | (2013.01) |
| *H04L 29/06* | (2006.01) |
| *G06F 21/53* | (2013.01) |
| *G06F 3/06* | (2006.01) |
| *G06F 17/30* | (2006.01) |
| *H04L 29/08* | (2006.01) |

(52) U.S. Cl.
CPC .......... *G06F 21/6209* (2013.01); *G06F 3/06* (2013.01); *G06F 17/30* (2013.01); *G06F 17/30082* (2013.01); *G06F 21/53* (2013.01); *G06F 21/6272* (2013.01); *H04L 29/00* (2013.01); *H04L 63/10* (2013.01); *H04L 63/101* (2013.01); *H04L 63/102* (2013.01); *H04L 63/105* (2013.01); *H04L 67/10* (2013.01)

(58) Field of Classification Search
CPC ... G06F 21/6209; G06F 21/53; G06F 21/6272
USPC .......................................................... 726/30
See application file for complete search history.

(56) References Cited

U.S. PATENT DOCUMENTS

| | | | |
|---|---|---|---|
| 8,601,498 B2 | 12/2013 | Laurich et al. | |
| 8,620,879 B2 | 12/2013 | Cairns | |
| 2010/0332401 A1 | 12/2010 | Prahlad et al. | |
| 2012/0084261 A1 | 4/2012 | Parab et al. | |
| 2012/0290926 A1 | 11/2012 | Kapadia et al. | |
| 2013/0024424 A1 | 1/2013 | Prahlad et al. | |
| 2013/0254538 A1 | 9/2013 | Orsini et al. | |

(Continued)

FOREIGN PATENT DOCUMENTS

| | | |
|---|---|---|
| CN | 102254117 A | 11/2011 |
| CN | 102592102 A | 7/2012 |

(Continued)

*Primary Examiner* — Brandon Hoffman
*Assistant Examiner* — Michael D Anderson
(74) *Attorney, Agent, or Firm* — Van Pelt, Yi & James LLP

(57) ABSTRACT

Protecting data files is disclosed, including: in response to an indication that a data file has been generated by a client device, determining a security classification associated with the data file; determining that the security classification associated with the data file comprises a classified file; storing the data file in a designated virtual storage area; and generating a stub file at an original storage location of the data file, wherein the stub file includes a viewing permission associated with the data file and a storage location of the data file in the designated virtual storage area.

18 Claims, 11 Drawing Sheets

(56) References Cited

U.S. PATENT DOCUMENTS

2014/0157363 A1\* 6/2014 Banerjee ............. G06F 9/45558
726/2

FOREIGN PATENT DOCUMENTS

CN 103942492 7/2014
WO WO 2008095237 A1 \* 8/2008 ....... G06F 17/30153

\* cited by examiner

GENERATING A STUB FILE CORRESPONDING TO A CLASSIFIED DATA FILE

CROSS REFERENCE TO OTHER APPLICATIONS

This application claims priority to People's Republic of China Patent Application No. 201510295401.9 entitled A METHOD, A DEVICE, AND TERMINAL EQUIPMENT FOR PROTECTING DATA FILES filed Jun. 2, 2015 which is incorporated herein by reference for all purposes.

FIELD OF THE INVENTION

The present application relates to the field of Internet technology. In particular, the present applications relates to techniques for protecting data files.

BACKGROUND OF THE INVENTION

In the free and open environment of the Internet, data use, storage, and transmission all run the risk of leaks. Conventionally, data is protected by transparent file encryption and decryption methods. In particular, an example of a conventional technique of data protection includes the following: While a client device operating system is performing base-level processing, a data file undergoes encryption processing. When a user retrieves a data file, the operating system decrypts the data file and then places it in memory for the use of the user. When the user needs to save the data file, the operating system encrypts the data file and writes it into a magnetic disk, thereby making the user completely unaware of the encryption and decryption actions performed on the data file. Therefore, conventionally, data leaks are prevented by writing encrypted data into a magnetic disk and performing the encryption of data in memory. However, these conventional techniques do not ensure that the file in memory will not leak.

BRIEF DESCRIPTION OF THE DRAWINGS

Various embodiments of the invention are disclosed in the following detailed description and the accompanying drawings.

DETAILED DESCRIPTION

Figure 1:
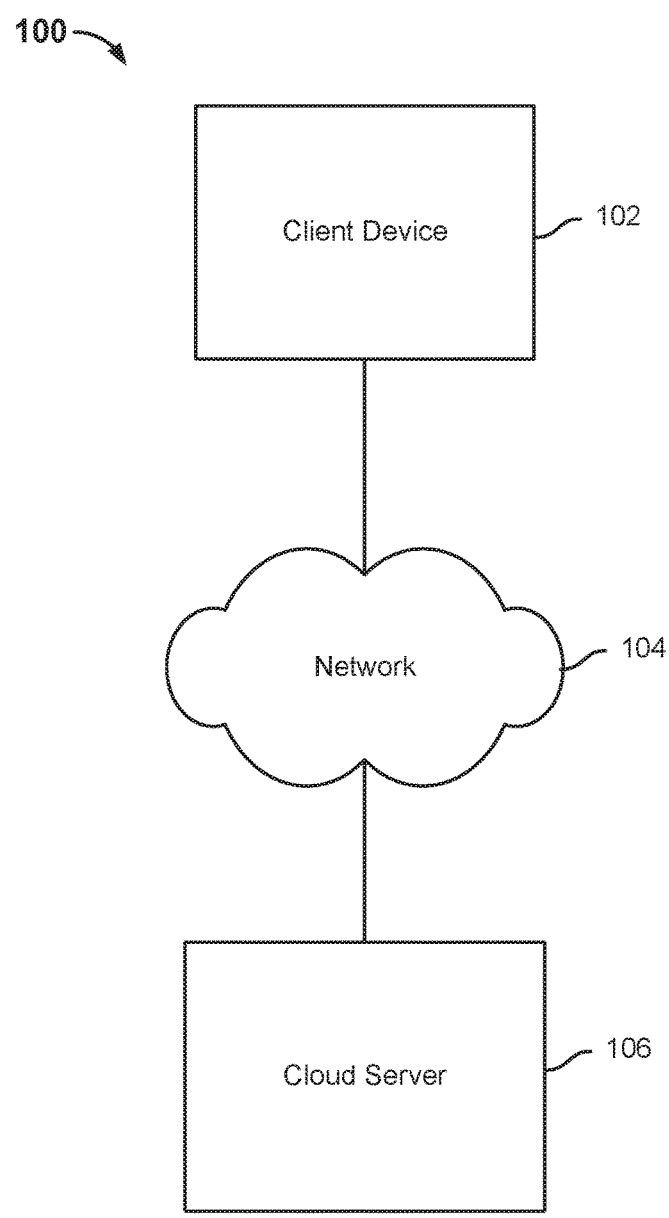
FIG. 1 is a diagram showing an embodiment of a system for protecting data files.

The invention can be implemented in numerous ways, including as a process; an apparatus; a system; a composition of matter; a computer program product embodied on a computer readable storage medium; and/or, a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The exemplary embodiments will be explained in detail here. Examples thereof are presented in the drawings. In cases where the following descriptions relate to figures, the same numbers in different figures represent the same or similar elements, unless otherwise indicated. The implementations described in the exemplary embodiments below do not represent all of the implementations consistent with the present application. On the contrary, they are merely examples of devices and methods consistent with some aspects of the present application, as described in detail in the claims.

The terms used in the present application merely serve to describe specific embodiments, and are not intended to restrict the present application. The singular forms of "a," "said," and "the" used in the present application and the attached claims are also intended to include plural forms, unless otherwise clearly indicated by the context. Also, please understand that the term "and/or" used in this document refers to and contains any or all possible combinations of one or more associated elements.

Please understand that although the present application employs the terms "first," "second," "third," and so on to describe various information, this information shall not be limited by these terms. These terms merely serve to differentiate pieces of information of the same category. For example, so long as they remain within the scope of the present application, a first piece of information could be called a second piece of information. Similarly, a second piece of information could be called a first piece of information. It depends on the context, for example, the term "if" that is used herein may be interpreted as "when" or "upon being confirmed."

Embodiments of protecting data files are described herein. In response to an indication of a generation of a data file at a client device, a security classification associated with the data file is determined. It is determined that the security classification associated with the data file is a classified file. The data file is then stored in a designated virtual storage area. For example, the designated virtual storage area is a part of a cloud server. In various embodiments, a "cloud server" refers to one or more servers that work in concert to provide one or more services. A stub file is generated at an original storage location of the data file. Furthermore, the copy of the data file is removed/deleted from the client device. The stub file includes a viewing permission associated with the data file and a storage location of the data file in the designated virtual storage area but not the actual content of the data file. Because the stub file does not include any data from the data file itself, any operations performed by the user on the stub file at the client device will not have any effect on the data file, which is stored at a cloud server.

FIG. 1 is a diagram showing an embodiment of a system for protecting data files. In the example, system 100 includes client device 102, network 104, and cloud server 106. In some embodiments, network 104 comprises high speed networks and/or telecommunication networks.

Client device 102 generates a data file. Examples of client device 102 include a mobile device, a smart phone, a laptop computer, a desktop computer, a tablet device, or any computing device. In some embodiments, client device 102 generates the data file by receiving the data file from another client device. In some embodiments, client device 102 generates the data file by downloading the data file as an attachment from a message received at client device 102 and/or downloading the data file from a website. The data file can be generated at client device 102 in any appropriate manner. Client device 102 determines a security classification associated with the received data file. The security classification indicates that the data file is a classified file. In response to determining that the data file is a classified file, client device 102 is configured to store the data file at a designated virtual storage area. In various embodiments, the designated storage area is disk (or solid state) storage at cloud server 106. After client device 102 sends the data file to cloud server 106 over network 104, client device 102 generates a stub file associated with the data file, removes its copy of the data file, and stores the stub file in the original storage location of the data file at client device 102. As such, once client device 102 uploads the data file to cloud server 106, client device 102 no longer retains a copy of the data file but rather just the stub file that is associated with the data file. Once cloud server 106 has successfully stored the data file, cloud server 106 is configured to send the storage location of the data file at the designated virtual storage area to client device 102 over network 104. In various embodiments, the stub file records various information associated with the data file including a viewing permission associated with the data file and a storage location of the data file at the designated virtual storage area of cloud server 106. The viewing permission associated with the data file specifies which individual users and/or user roles may access (e.g., read, write, read and write) the data file.

To access the data file, the user of client device 102 is configured to select the stub file using a virtualized control and management application executing at client device 102. For example, the user of client device 102 can browse through stub filed of data files that are stored at cloud server 106 via the virtualized control and management application at client device 102. The user of client device 102 can select the stub file corresponding to a data file to access. In response to the user's selection to share the stub file, the virtualized control and management application is configured to determine whether the user of client device 102 has permission to access the data file by comparing the user's identifying information to the viewing permission that is recorded in the selected stub file. For example, if the user's identifying information is specified by the selected stub file to at least be permitted to read the stub file, then the virtualized control and management application is configured to permit the access action. In the event that the user is determined to be able to access the data file, a virtual application is configured to launch/execute at client device 102 and establish a connection with cloud server 106. The user of client device 102 can use a virtual application executing at client device 102 to access the data file stored at cloud server 106, including by performing word processing operations on the data file. The virtual application is isolated from the operating system of client device 102, which means that the operations performed within the virtual application are isolated from the storage of client device 102 and/or the memory of client device 102.

In some embodiments, a user of client device 102 can share the data file with another client device (not shown in the diagram) using the virtualized control and management application executing at client device 102. The user of client device 102 can select the stub file corresponding to a data file to share with a user associated with another client device. In response to the user's selection to share the stub file, the virtualized control and management application is configured to determine whether the other user with which the data file is to be shared has permission to access the data file by comparing the other user's identifying information to the viewing permission that is recorded in the selected stub file. For example, if the user's identifying information is specified by the selected stub file to at least be permitted to read the stub file, then the virtualized control and management application is configured to permit the sharing action. In the event that the other user is determined to be able to access the data file, the virtualized control and management application is configured to send an instruction to the client device of the user with which the data file is to be shared. The sent instruction is configured to generate a copy of the selected stub file at the client device of the user with which the data file is to be shared such that the other user can access the data file at cloud server 106 using the stub file.

As such, storing a classified data file in a designated virtual storage area of cloud server 106 while providing access from client device 102 can thus isolate the operations performed on the data file in a virtual environment. The use of the virtual environment can therefore prevent any malicious accesses to the data file at client device 102 by a user and/or program without the appropriate access permissions or through tampering with client device 102. Because the stub file records the viewing permission for the data file and the data file's storage location in the designated virtual storage area but does not include any data from the data file itself, any operations performed by the user on the stub file that is stored at client device 102 will not have any effect on the data file stored at cloud server 106.

Figure 2:
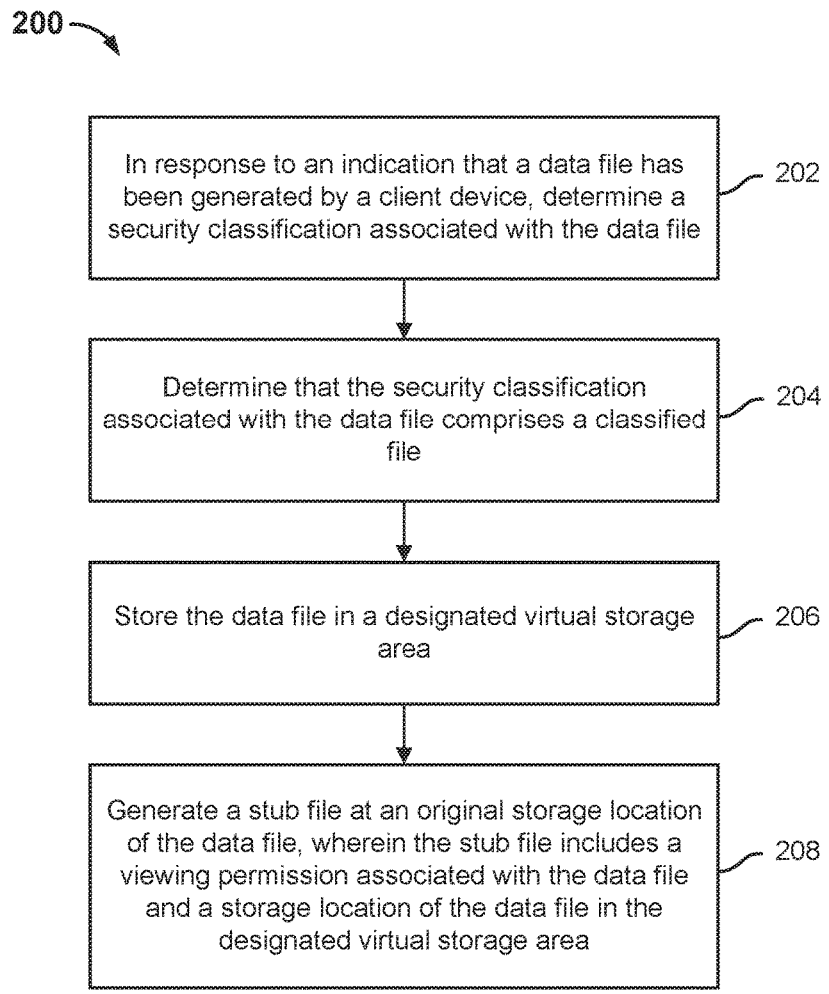
FIG. 2 is a flow diagram showing an embodiment of a process for protecting data files.

FIG. 2 is a flow diagram showing an embodiment of a process for protecting data files. In some embodiments, process 200 is implemented at system 100 of FIG. 1.

At 202, in response to an indication that a data file has been generated by a client device, a security classification associated with the data file is determined.

For example, the data file can be generated at the client device through copying a new file, downloading a new file, or creating a new file.

In various embodiments, the security classification of the data file is set by a user, such as the user that generated the file, for example. In some embodiments, the security classification of the data file comprises a confidentiality grade for the data file. For example, the security classification may be set at level 0, level 1, or level 2, where each level represents a different confidentiality grade with respect to the data file. For example, level 0 indicates that the user does not need to employ security measures for the data file and level 1 indicates that the user needs to take security measures for the data file. In another example, level 0 indicates that the user does not need to employ security measures for the data file, level 1 indicates that the user needs to employ security measures for the data file on the client device, and level 2 indicates that the user needs to employ security measures for the data file on the client device and on the cloud server.

In some embodiments, the content information of a data file can be determined first to determine the security classification associated with the data file. For example, the content information of the data file can be matched against a first preset condition and the security classification of the data file is determined according to the first match result. For example, the first preset condition may include multiple key phrases, such as "encrypted," "private," or "non-public." When the system detects that the content information of the data file includes content such as "encrypted" or "private," the security classification of the data file according to the first match result can be determined to be level 1, which indicates that the user needs to take security measures for the data file. If the content information does not contain the aforementioned key phrases, it is possible to determine that the classification level of the data according to the first match result is level 0, which indicates that the user does not need to take security measures for the data file. In a second example, the file name of a data file can be matched against a second preset condition and the security classification of the data file is determined according to the second match result. For example, the second preset condition may include multiple key phrases, such as "secret" or "encrypted." If the system detects that the file name of the data file includes content such as "secret" or "encrypted," the security classification of the data file according to the first match result can be determined to be level 1, which indicates that the user needs to take security measures for the data file. If the file name does not contain the aforementioned key phrases, it is possible to determine that the classification level of the data according to the second match result is level 0, which indicates that the user does not need to take security measures for the data file.

At 204, it is determined that the security classification associated with the data file comprises a classified file.

The security classification associated with the data file is determined based on a technique, such as one described above, and it is determined that the data file is a classified file based on the security classification.

In the event that the data file is determined to be an unclassified file (e.g., a file for which there is not required security measures), then the data file can be stored normally and/or provided to a user normally. Storage and/or use of unclassified files will not be described further.

At 206, the data file is stored in a designated virtual storage area.

The data file that is determined to be a classified file is stored in a designated virtual storage area In some embodiments, the virtual storage area may be a specific magnetic disk array section that is on a magnetic disk of the client device and that is for storing data files that require security measures (e.g., classified files). When the user needs to access a data file stored in a virtual storage area, a virtual application that is isolated (and that may include storage isolation, memory isolation, etc.) from the client device operating system is initiated at the client device and the data file stored in the virtual storage area of the client device can be accessed through the virtual application.

In some embodiments, the virtual storage area may be a specific magnetic disk array section that is on a magnetic disk of a (e.g., remote) cloud server and that is for storing data files that require security measures (e.g., classified files). When the user's client device cannot store a data file or cannot adopt security measures for a data file, a virtual application that is isolated (and that may include storage isolation, memory isolation, etc.) from the client device operating system is initiated at the client device and the data file stored in the virtual storage area of the cloud server can be accessed through the virtual application. It is thus possible to isolate any operations performed on a data file stored in the virtual storage area on the cloud server within a virtual environment and prevent the data file from leaking.

At 208, a stub file is generated at an original storage location of the data file, wherein the stub file includes a viewing permission associated with the data file and a storage location of the data file in the designated virtual storage area.

The data file was stored at an original storage location (e.g., at a storage associated with the client device) prior to being stored at a storage location at the designated virtual storage area. In various embodiments, once the data file is stored at the designated virtual storage area, the copy of the data file is deleted from the original storage location and a stub file is stored at the original storage location instead. In various embodiments, the stub file records the viewing permission(s) associated with the data file and the storage location of the data file at the designated virtual storage area. In various embodiments, the viewing permission(s) associated with the data file specifies the specific users and/or the roles (e.g., administrator users, guest users, guests of a certain group of users) of users that are allowed to access read, write to, read and write to) the data file.

In various embodiments, when a user selects the stub file at the client device, the stub file stored at the original storage location of the data file will be read by (e.g., the operating system of) the client device to determine whether the selecting user has viewing permission. The data file may be retrieved from the storage location in the designated virtual storage area only if it has been determined that the selecting user has viewing permission to access the data file. Thereupon, the data file is viewed from the storage position in the designated virtual storage area. As will be described in further detail below, accessing the data file from the designated virtual storage system includes running a virtualized environment that provides access to the data file at the designated virtual storage area (e.g., of a cloud server). However, if the selecting user does not have viewing permission, the selecting user is denied access to the data file in the designated virtual storage area.

Figure 3:
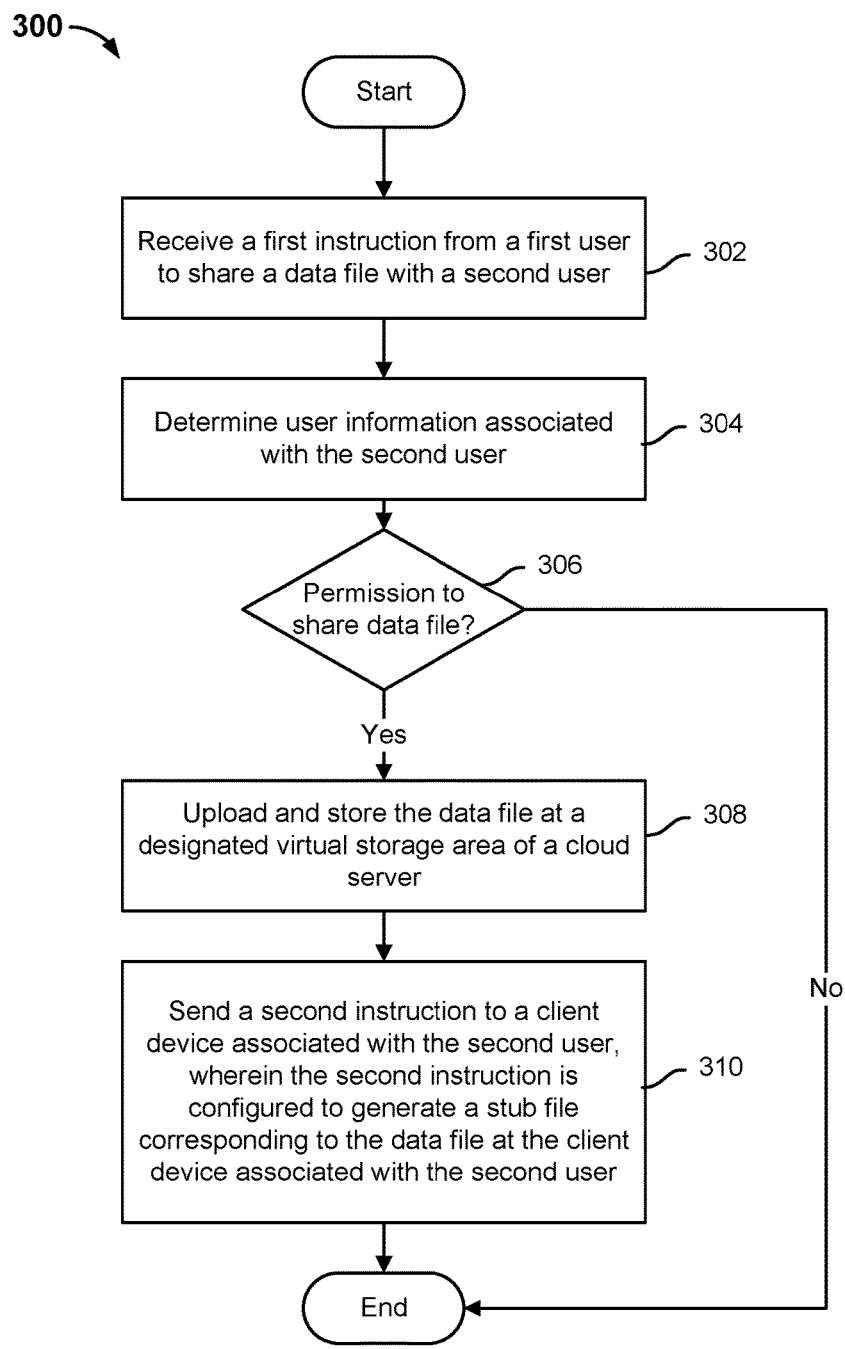
FIG. 3 is a flow diagram showing an embodiment of a process for sharing a protected data file.

FIG. 3 is a flow diagram showing an embodiment of a process for sharing a protected data file. In some embodiments, process 300 is implemented at system 100 of FIG. 1.

At 302, a first instruction is received from a first user to share a data file with a second user.

In some embodiments, a first user can share a data file with another user by using a client device application or a stub file-sharing key to initiate sharing the stub file with a designated other user. In some embodiments, the data file to be shared is already uploaded to a cloud server and only the stub file that corresponds to the data file is stored at the client device of the user that wishes to share the data file with the other user.

At 304, user information associated with the second user is determined. In some embodiments, user information may include the account number of the other user in the client application, or it may include an email address where the other user can receive the data file. In other words, the present application does not impose restrictions concerning the address contained in the user information with which data files can be shared. All that is necessary is that the other user is enabled to receive the data file.

At 306, it is determined whether the second user has permission to access the data file based at least in part on the user information associated with the second user. In the event that the second user is determined to have permission to access the data file, control is transferred to 308. Otherwise, in the event that the second user is determined not to have permission to access the data file, the second user is denied access to the data file (e.g., a message that the data file cannot be shared with him/her is sent to the second user) and process 300 ends.

The user information associated with the second user is compared to the viewing permission associated with the data file that is included in the stub file of the data file to determine whether the second user has permission to access the data file. For example, the user information associated with the second user can include identifying information associated with the second user and/or a role associated with the second user.

At 308, the data file is uploaded to and stored at a designated virtual storage area of a cloud server.

In some embodiments, if a copy of the data file is not already uploaded to and stored at the designated virtual storage area of a cloud server (e.g., for backup storage), then a copy of the data file is uploaded to the designated virtual storage area of a cloud server. For example, the first user that wishes to share the data file with the second user may use a client device application or a stub file upload key to upload the data file to a cloud server. In some embodiments, the client application may be virtualized control and management software installed on the client device.

At 310, a second instruction is sent to a client device associated with the second user, wherein the second instruction is configured to generate a stub file corresponding to the data file at the client device associated with the second user.

In some embodiments, identifying information associated with the second user is determined from the user information associated with the second user. After the second user receives the second instruction through the corresponding client device, a stub file for the data file on the client device of the second user is generated based on the second instruction. For example, the generated copy of the stub file is stored at an original location that the data file would have been stored at the client device of the second user. The second user's client device can then use the stub file as a basis for acquiring the data file from the designated virtual storage area of the cloud server. As described above, in various embodiments, the stub file records the viewing permission(s) associated with the data file and the storage location of the data file at the designated virtual storage area.

As described in process 300, when there is a need to share a data file, a second instruction is sent to the second user according to the user information. After the second user confirms receipt of the data file through their client device, a data file stub file is generated on the second user's client device. Therefore, the sharing of a data file that needs to be kept confidential is virtually shared by sharing a stub file. Because the underlying data of the data file is not sent to the second user and the shared stub file only stores the storage location and viewing permission of the data file in a virtual storage area and does not include any data information of the data file itself, any operations performed by the second user on his or her copy of the stub file will not have any effect on the data file. This ensures that no confidential information will be leaked from the data file in the sharing process.

Figure 4:
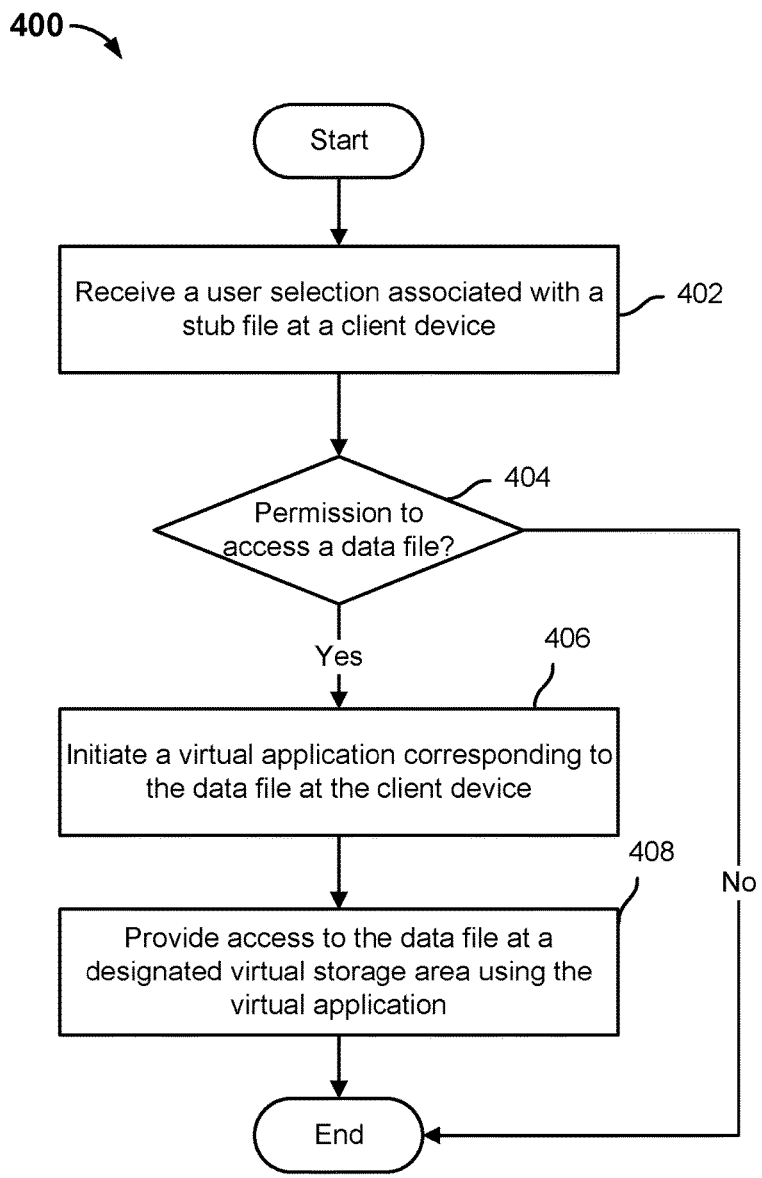
FIG. 4 is a flow diagram showing an embodiment of a process for using a protected data file.

FIG. 4 is a flow diagram showing an embodiment of a process for using a protected data file. In some embodiments, process 400 is implemented at system 100 of FIG. 1.

At 402, a user selection associated with a stub file is received at a client device.

A user selection associated with a stub file is received at a client device. In various embodiments, the stub file corresponds to a data file that is stored in a designated virtual storage area of a cloud server and is generated based on a process such as process 200 of FIG. 2 or process 300 of FIG. 3. For example, the stub file was displayed in a file browser application that is executing at the client device. In some embodiments, the stub file is displayed in the file browser application in the same manner as the data file with which it is associated would have been displayed had it been stored locally at the client device, instead of at a designated virtual storage area of a cloud server.

In some embodiments, a client application installed on the client device may be used to monitor for stub file-related click events. In some embodiments, a user has already logged onto the client application using the user's credentials. In some embodiments, the click event can be a double-click event on the stub file or it may be a click event on the stub file when it is displayed on a presented menu or file browser application. In some embodiments, the client application may record the stub files and thus be able to determine whether a clicked file is a stub file or an ordinary data file.

At 404, it is determined whether a user associated with the user selection has permission to access a data file associated with the stub file based at least in part on a viewing permission associated with the data file that is included in the stub file. In the event that the user associated with the user selection does have permission to access the data file, control is transferred to 406. Otherwise, in the event that the user associated with the user selection does not have permission to access the data file, the user is denied access to the data file and process 400 ends.

As described above, a stub file records the viewing permission of a corresponding data file and the storage location of the data file in the designated virtual storage area of the cloud server. User information associated with the user that had made the selection of the stub file is compared to the viewing permissions included in the stub file to determine whether the user associated with the selection is a user that has viewing permission of the data file.

At 406, a virtual application corresponding to the data file is initiated at the client device.

At 408, access to the data file at a designated virtual storage area is provided using the virtual application.

Figure 5:
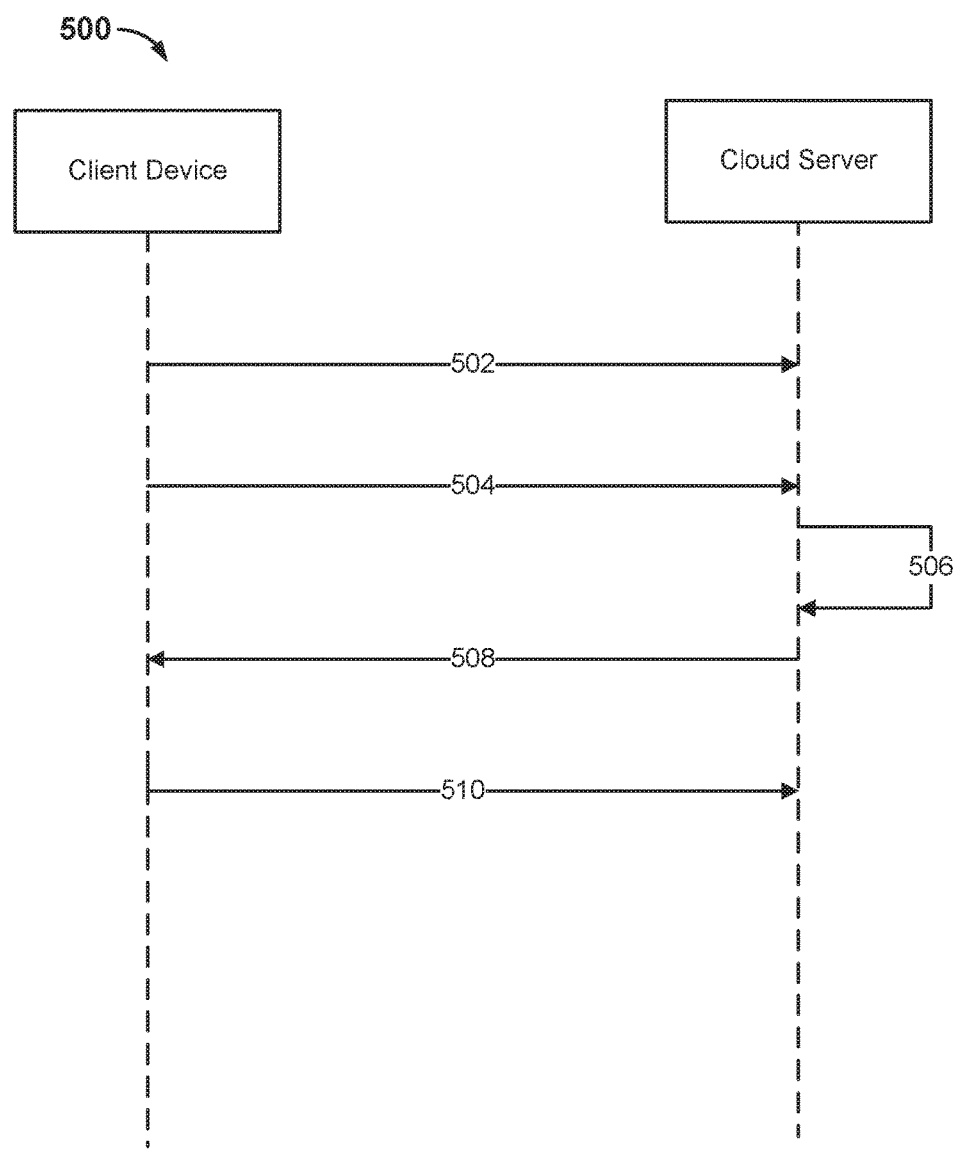
FIG. 5 is a flow diagram showing an example of a process for accessing a protected data file.

In various embodiments, the virtual application is a virtualized control and management software application installed on the client device. In various embodiments, the virtual application is isolated from the operating system of the client device. In various embodiments, the isolation of the virtual application from the operating system may include storage isolation from the operating system and it may also include memory isolation from the operating system. Thus, the virtual application can ensure that any operation performed by the user on the data file is isolated within the virtual environment as provided by the virtual application and thereby prevents malicious users that are not granted access to the virtual application from obtaining any data resources from within the virtual application. In some embodiments, the user's access to the data file via the virtual application may include normal reading, editing, and use of clipboards, for example. In some embodiments, operations performed by the user on the data file will be executed at the cloud server at which the data file is stored and not on the client device at which the stub file is stored. In various embodiments, the virtual application is configured to locate the data file stored at the designated virtual storage area of a cloud server using the storage location of the data file that is included in the stub file. FIG. 5 below shows an example of using the virtual application to access a data file stored at the designated virtual storage area of a cloud server.

FIG. 5 is a flow diagram showing an example of a process for accessing a protected data file. In some embodiments, process 500 is implemented at system 100 of FIG. 1.

In various embodiments, a stub file corresponding to a (e.g., classified) data file is stored on a client device while the data file is stored in a designated virtual storage area on a cloud server. Process 500 is an example of a process for obtaining the data file from the designated virtual storage area on the cloud server using a virtual application after the stub file was selected at the client device (e.g., as described in process 400 of FIG. 4, above).

At 502, a client device initiates a remote desktop protocol (RDP) component to connect to a cloud server at which a data file is stored based at least in part on information included in a stub file associated with the data file.

After detecting that a user has selected the stub file at the client device (e.g., using a process such as process 400 of FIG. 4, above), the client device starts a remote desktop protocol (RDP) component according to the information recorded in the stub file. The RDP component is an example virtual application that can be used to access a data file at a cloud server at which the data file is accessed. The RDP component is used to connect to the cloud server at which the data file is stored.

At 504, the client device transmits the information included in the stub file via the RDP component to the cloud server.

In some embodiments, all the data information recorded in the stub file has been encrypted by a client application. The encrypted data application records the information associated with the data file corresponding to the stub file including, for example, one or more of: the storage location of the data file at the designated virtual storage area of the cloud server, user permissions for the data file, the data file-sharing procedure, and historical records on use of the data file. In some embodiments, information included in the stub file that is transmitted from the client device to the cloud server includes, for example, one or more of: a storage location of a designated virtual storage area of the cloud server at which the data file is stored, client application user permissions, information that the user needs to validate, and the virtual storage path on the server for the data file that is to be opened.

At 506, after the cloud server verifies the transmitted information, the cloud server starts a remote virtualization program on the client device and opens the data file on the cloud server according to a designated virtual storage area storage location included in the stub file.

At 508, the cloud server maps a document editor program onto the client device.

In some embodiments, the cloud server may establish a new editable file using a document editor program (e.g., Microsoft Word) and then transmit the entire visible window for the editable file onto the client device. A remote document editor can thus be mapped onto the client device. In some embodiments, mapping the document editor onto the client device includes sending a user interface of the document editor to be presented at the client device.

At 510, the client device uses the document editor program to perform operations on the data file stored on the cloud server.

In some embodiments, the operations that are received at the client device from a user to perform on the data file using the document editor program that is mapped by the cloud server onto the client device may include viewing or editing the data file contents and copying the data file, for example. The user operations performed through the document editor program user interface at the client device are sent to the cloud server and then executed on the data file at the cloud server. The present application imposes no restrictions as to the specific operations vis-à-vis the data file.

In a first example, after a first user shares a (e.g., classified) data file with a second user (e.g., using a process such as process 300 of FIG. 3), the second user receives only a stub file at his or her client device rather than a copy of the data file itself. When the second user needs to use the stub file as a basis to obtain the data file from the cloud server, the second user can select the stub file stored at the client device of the second user and processes such as process 400 of FIG. 4 and process 500 of FIG. 5 can be used to provide the user access to the data file that is stored at a designated virtual storage area of the cloud server.

In a second example, if the data file is stored in a designated virtual storage area of the cloud server because the client device magnetic disk has limited storage space or is not set up with a virtual storage area, processes such as process 400 of FIG. 4 and process 500 of FIG. 5 can be used to provide a user of a client device access to the data file from the virtual area of the cloud server when the user needs to obtain the data file from the cloud server based on the stub file.

In a third example, when a user needs to perform operations on a data file from a cloud server via a different client device, process 400 of FIG. 4 and process 500 of FIG. 5 can be used to provide access to the data file remotely. For example, a user on client device A generates a stub file for a data file and stores the data file in a virtual area of client device A. When the user sends the stub file from client device A to client device B, and after client device A uploads the data file to the cloud server, the user can use process 400 of FIG. 4 and process 500 of FIG. 5 to perform operations on the data file from the cloud server if the user needs to retrieve the data file from client device B.

The virtualization cost of applications such as Citrix XenApp and other such applications can be quite high. Thus, as described above, the present application can use, for example, a Windows operating system by employing an RDP-based application virtualization scheme. By using an RDP control component, a message hook, and window clipping technology, remote application virtualization technology can be achieved, thus avoiding reliance on a client device's own operating system and enabling the cloud server to employ any Windows operating system, which is more flexible for the user of the data file.

The following example is based on the embodiments described above: When a data file is subjected to operations by a user, a client application installed on the client device may also be used to monitor the operations performed by the user on the data file. In some embodiments, the operations performed by the user on the data file may be performed on the client device or they may be performed on the data file by the user via a document editor mapped onto the client device from the cloud server, thus allowing for effective monitoring and management of data file opening, operating, flowing, and all other data file-related actions that are performed by the user.

Figure 6:
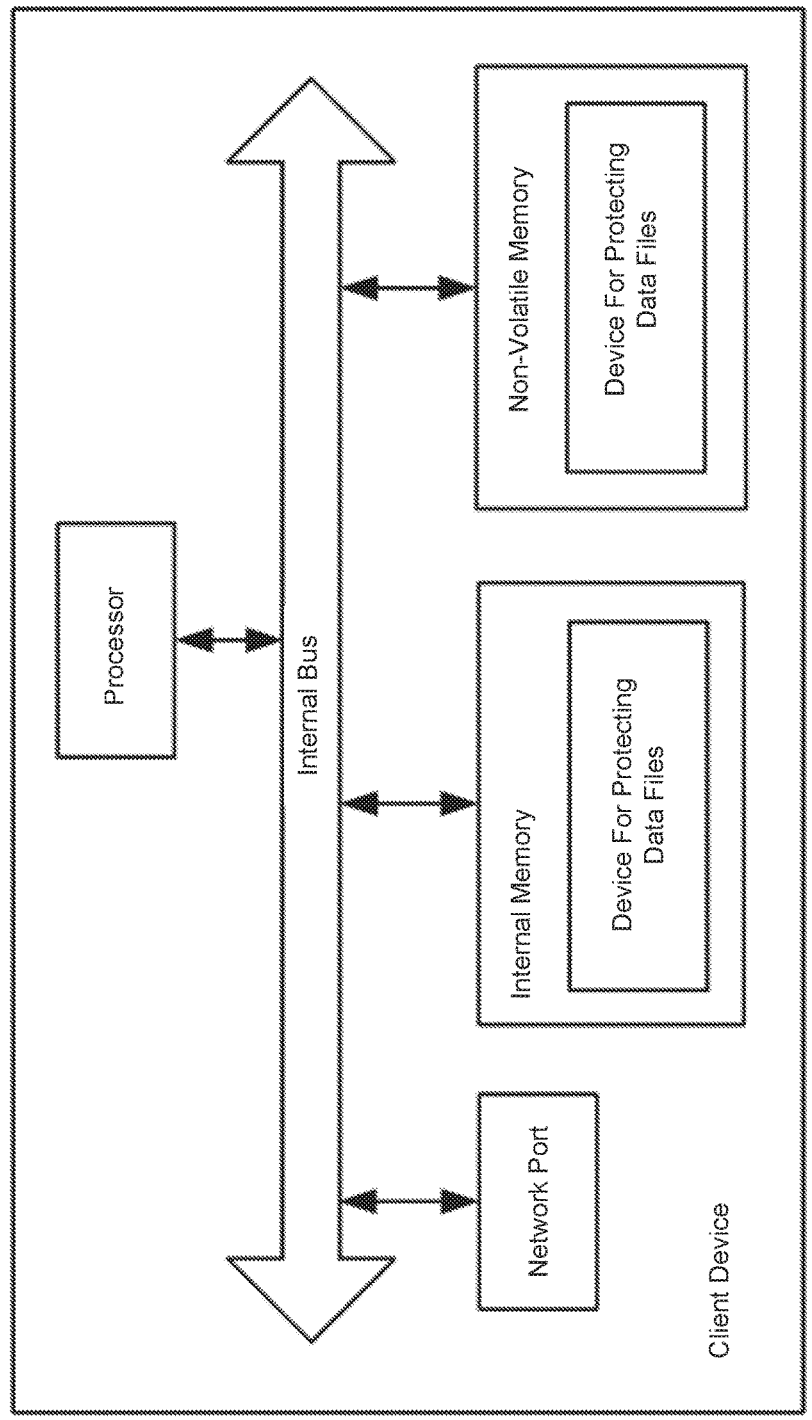
FIG. 6 is a diagram showing an example client device for protecting data files.

FIG. 6 is a diagram showing an example client device for protecting data files. As shown in the example, the client device comprises a processor, an internal bus, network ports, internal memory, and non-volatile memory. In practice, the client device may also include other hardware as needed to perform business services. The processor can obtain a corresponding computer program from the non-volatile memory to the internal memory and then execute it. The data file protection device is formed in the logical layer. The present application does not exclude other implementations in addition to a software implementation, e.g., a logic device or a combined software/hardware form. In other words, the entity that executes the processes as described above need not be limited to various logical units and can be hardware, software, or a combination of both.

Figure 7:
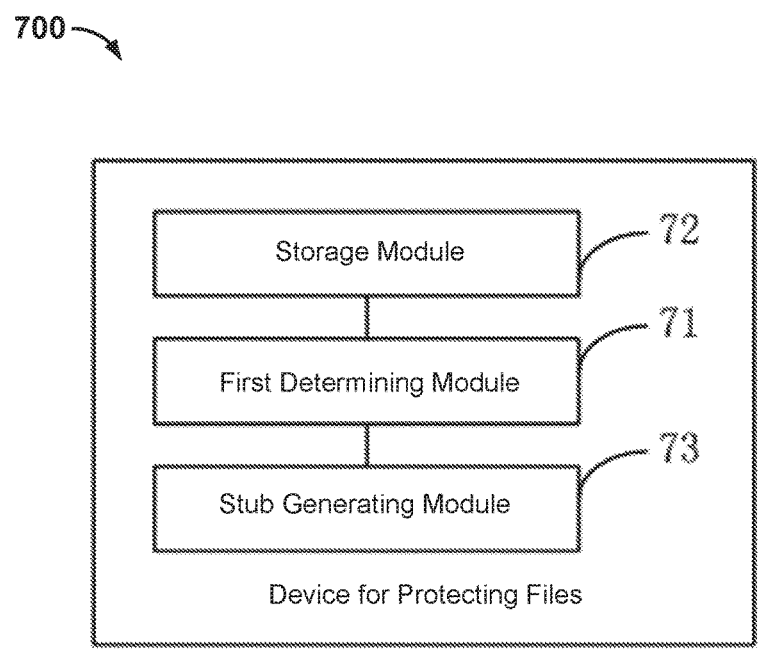
FIG. 7 is a diagram showing an example client device for protecting data files.

FIG. 7 is a diagram showing an example client device for protecting data files. In the example, device 700 includes first determining module 71, storage module 72, and a stub generating module 73.

The modules and units can be implemented as software components executing on one or more processors, as hardware such as programmable logic devices, and/or Application Specific Integrated Circuits designed elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and units may be implemented on a single device or distributed across multiple devices.

First determining module 71 is configured to determine the security classification of a data file and an original storage location of the data file in response to a generation of the data file on the client device.

Storage module 72 is configured to store the data file in a designated virtual storage area if the security classification determined by the first determining module indicates that the data file is a classified file.

Stub generating module 73 is configured to generate a stub file at the original storage location determined by first determining module 71. The stub file is configured to record the viewing permission for the data file and the storage location of the data file in the designated virtual storage area.

Figure 8:
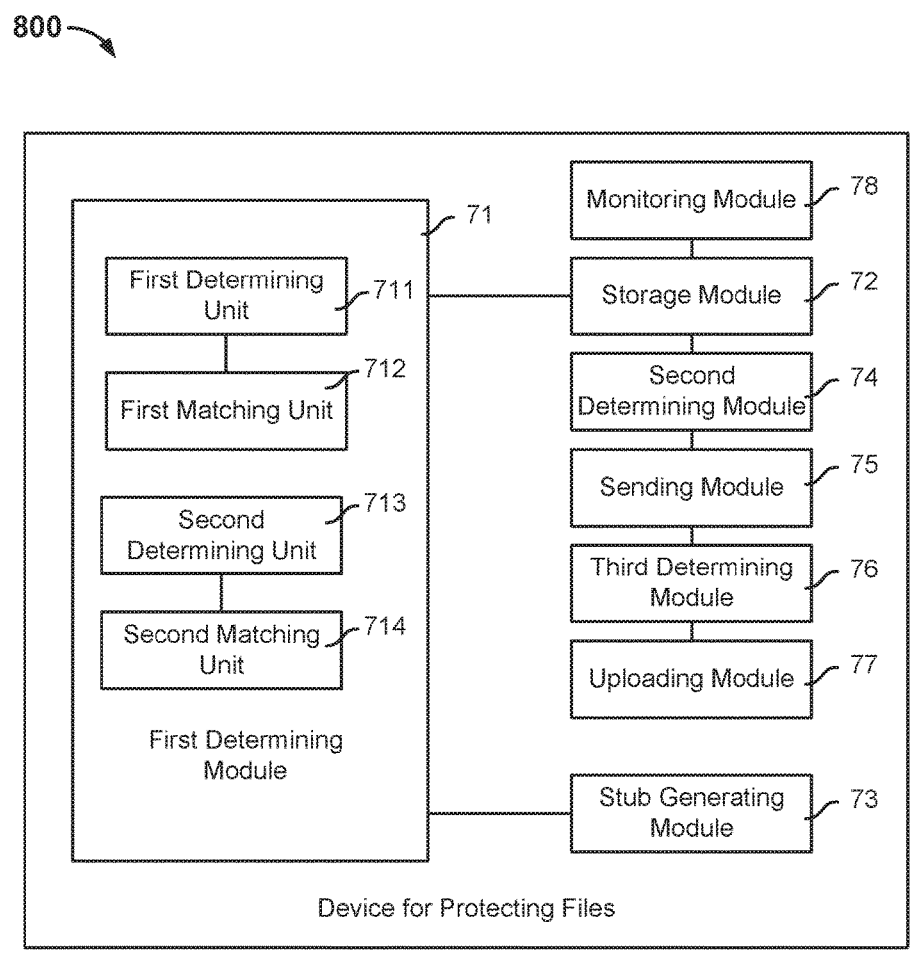
FIG. 8 is a diagram showing an example client device for protecting data files.

FIG. 8 is a diagram showing an example client device for protecting data files. In some embodiments, device 800 is an example implementation of device 700 of FIG. 7. In the example of device 800, first determining module 71 of device 700 includes first determining unit 711, first matching unit 712, second determining unit 713, and second matching unit 714. Device 800 further includes monitoring module 78, storage module 72, second determining module 74, sending module 75, third determining module 76, uploading module 77, and stub generating module 73.

First determining unit 711 is configured to determine the content information of the data file.

In some embodiments, first matching unit 712 is configured to match the content information determined by first determining unit 711 against a first preset condition and determine the security classification of the data file according to the first matching result.

In some embodiments, second determining unit 713 is configured to determine the file name of the data file.

A second matching unit 714 is configured to match the file name determined by second determining unit 713 against a second preset condition and determine the security classification of the data file according to the second matching result.

Second determining module 74 is configured to determine user information for a second user upon detecting a first instruction that indicates that a first user selects to share the data file that was stored by storage module 72 with a second user's client device that is designated by the first user.

Sending module 75 is configured to use the user information determined by second determining module 74 as a basis for sending to the second user a second instruction for instructing the second user to receive the data file. After the second user receives the data file through the corresponding client device, in some embodiments, sending module 75 is configured to generate a stub file for the data file on the client device of the second user.

Third determining module 76 is configured to use the user information determined by second determining module 74 as a basis for determining whether the second user has viewing permission with respect to the data file.

Uploading module 77 is configured to receive an indication from third determining module 76 associated with a determination that the second user has viewing permission with respect to the data file. In response to the indication, uploading module 77 is configured to upload the data file to a cloud server and store it such that the result is that the second user is able to use the stub file as a basis for acquiring the data file from the cloud server.

Monitoring module 78 is configured to use a client application installed on the client device to monitor the user operations that are performed by the user on the data file.

Figure 9:
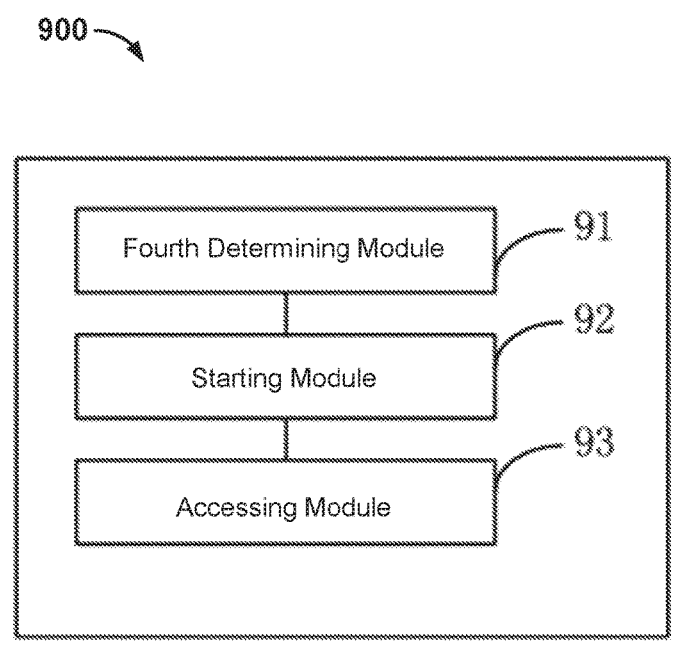
FIG. 9 is a diagram showing an example data file retrieval device.

FIG. 9 is a diagram showing an example data file retrieval device. In the example, device 900 includes fourth determining module 91, starting module 92, and accessing module 93.

Fourth determining module 91 is configured to determine whether a user associated with selecting a stub file has permission to access the data file according to the viewing permission recorded by the stub file.

In the event that fourth determining module 91 determines that the user does have permission to access the data file, starting module 92 is configured to initiate a virtual application corresponding to the data file.

Accessing module 93 is configured to use the virtual application started by starting module 92 to access the data file stored at the designated virtual storage area storage location recorded by the stub file.

Figure 10:
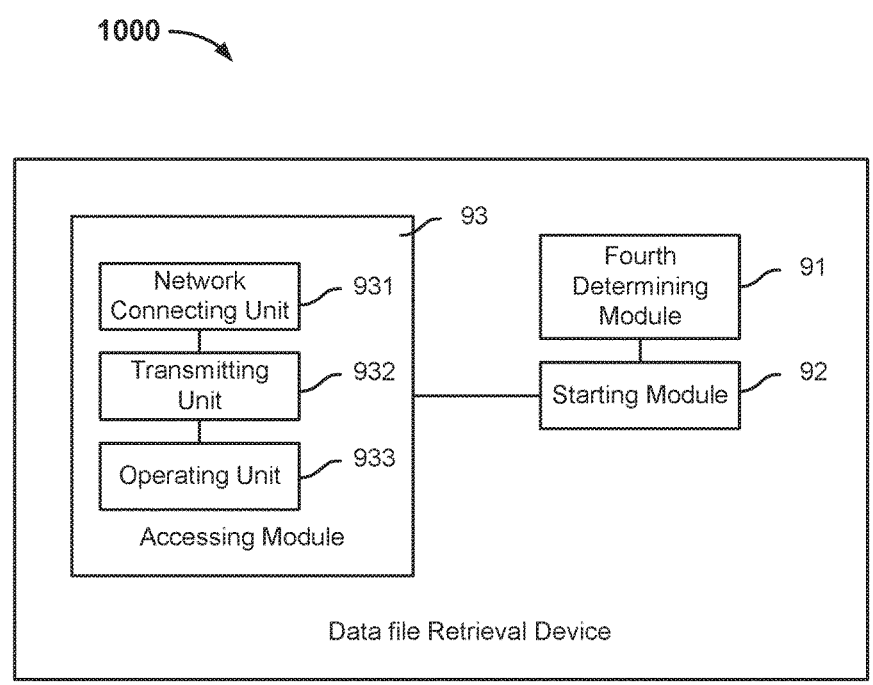
FIG. 10 is a diagram showing an example data file retrieval device.

FIG. 10 is a diagram showing an example data file retrieval device. In some embodiments, device 900 of FIG. 9 can be implemented using the example of device 1000. In the example of device 1000, accessing module 93 includes network connecting unit 931, transmitting unit 932, and operating unit 933.

Network connecting unit 931 is configured to connect to a cloud server through a remote desktop protocol component on the basis of information recorded by a stub file associated with a data file to be accessed.

Transmitting unit 932 is configured to transmit information recorded by the stub file via the remote desktop protocol component to the cloud server so that after the cloud server successfully verifies the information recorded by the storage file, the cloud server initiates a remote virtualization program on the client device and uses the designated virtual storage location recorded by the stub file as a basis for mapping a document editor program for editing the data file stored on the cloud server to the client device.

Operating unit 933 is configured to perform operations on the data file stored on the cloud server through the document editor.

Figure 11:
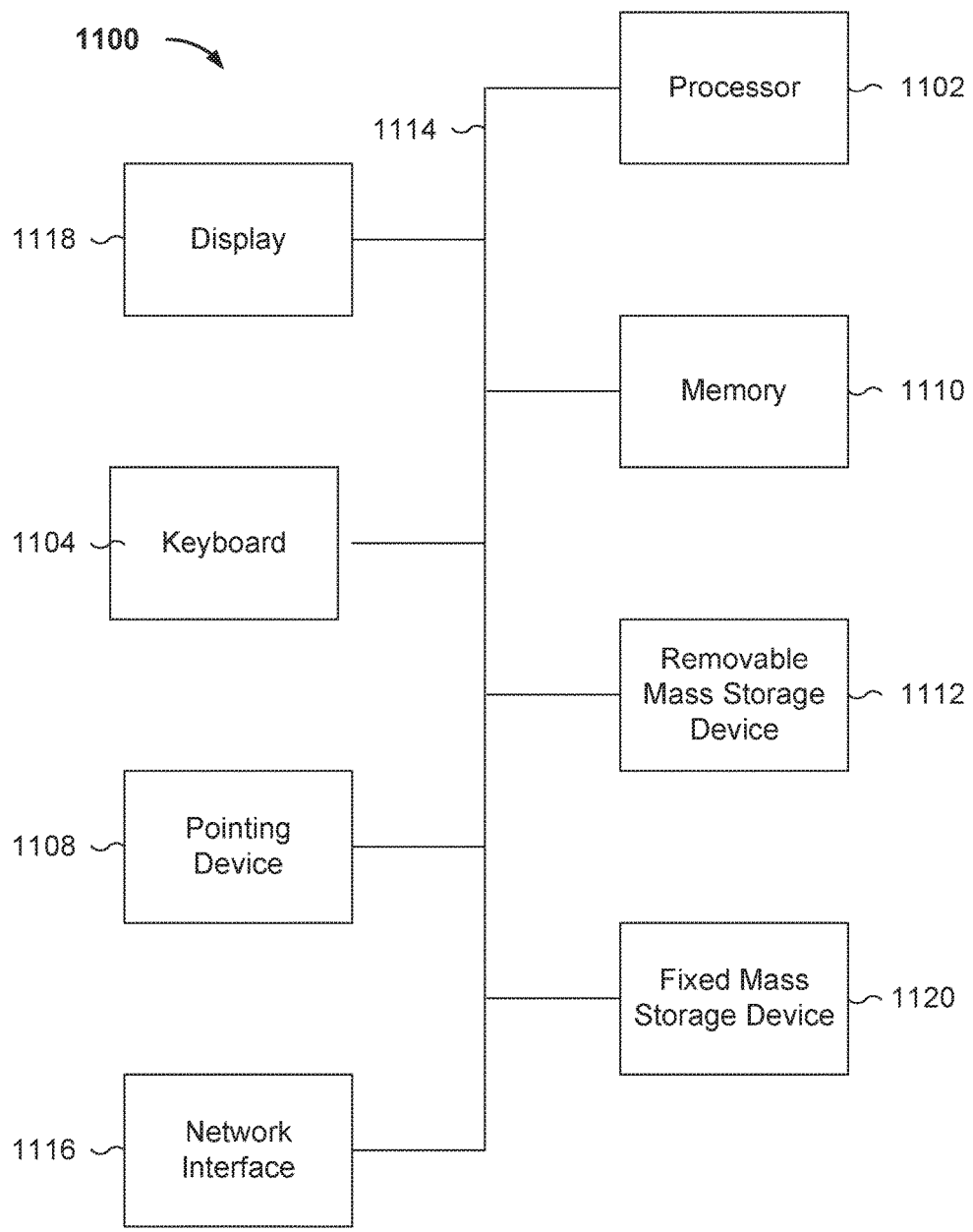
FIG. 11 is a functional diagram illustrating an embodiment of a programmed computer system for protecting data files.

FIG. 11 is a functional diagram illustrating an embodiment of a programmed computer system for protecting data files. As will be apparent, other computer system architectures and configurations can be used to protect data files. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118).

Processor 1102 is coupled bi-directionally with memory 1110, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data, and objects used by the processor 1102 to perform its functions (e.g., programmed instructions). For example, memory 1110 can include any suitable computer readable storage media, described below, depending on whether, for example, data access needs to be bi-directional or uni-directional. For example, processor 1102 can also directly and very rapidly retrieve and store frequently needed data in a cache memory (not shown).

A removable mass storage device 1112 provides additional data storage capacity for the computer system 1100 and is coupled either bi-directionally (read/write) or uni-directionally (read only) to processor 1102. For example, storage 1112 can also include computer readable media such as magnetic tape, flash memory, PC-CARDS, portable mass storage devices, holographic storage devices, and other storage devices. A fixed mass storage 1120 can also, for example, provide additional data storage capacity. The most common example of fixed mass storage 1120 is a hard disk drive. Mass storages 1112, 1120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display 1118, a network interface 1116, a keyboard 1104, and a pointing device 1108, as well as an auxiliary input/output device interface, a sound card, speakers, and other subsystems as needed. For example, the pointing device 1108 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

As described in various embodiments above, when a data file is determined to be a classified file, the data file is stored to a designated virtual storage area. Therefore, user operations on the data file stored in the designated virtual storage area can be isolated within a virtual environment and prevent the data file from being tampered with by malicious users and/or programs at a client device from which the data file is accessed. A stub file is generated at the original storage location of the data file at a client device. Because the stub file only records the viewing permission for the data file and the data file's storage location in the virtual storage area and does not include any data from the data file itself, any operations performed by the user on the stub file will not have any effect on the data file.

Upon considering the invention disclosed here in the description and in practice, persons skilled in the art shall easily think of other schemes for implementing the present application. The present application intends to cover any variation, use, or adaptation of the present application where these variations, uses, or adaptations comply with the general principles of the present application and include public knowledge or customary technical means in the art that have not been disclosed by the present application. The description and embodiments are regarded merely as illustrative. The true scope and spirit of the present application are indicated by the claims below.

Please also note that the term "comprise" or "contain" or any of their variants are to be taken in their non-exclusive sense. Thus, processes, methods, merchandise, or equipment that comprise a series of elements not only comprise those elements, but also comprise other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or equipment that comprise said elements.

The above-described are merely preferred embodiments of the present application and do serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    in response to an indication that a data file has been generated by a first client device, determining a security classification associated with the data file;
    determining that the security classification associated with the data file comprises a classified file;
    storing, using one or more processors, the data file in a designated virtual storage area;
    generating a first stub file at an original storage location of the data file, wherein the first stub file includes a viewing permission associated with the data file and a storage location of the data file in the designated virtual storage area;
    receiving a first instruction from a first user to share the data file with a second user;
    determining user information associated with the second user;
    determining that the second user has permission to access the data file based at least in part on the user information associated with the second user; and
    sending a second instruction to a second client device associated with the second user, wherein the second instruction is configured to generate a second stub file corresponding to the data file at the second client device associated with the second user, wherein the second stub file is configured to be usable to obtain the data file in the designated virtual storage area.

2. The method of claim 1, wherein the designated virtual storage area is associated with a cloud server.

3. The method of claim 1, wherein determining the security classification associated with the data file comprises:
    comparing content information associated with the data file against a preset condition; and
    determining the security classification based at least in part on a result of the comparison.

4. The method of claim 1, wherein the security classification associated with the data file is set by a third user.

5. The method of claim 1, further comprising storing the first stub file at the original storage location associated with the data file.

6. The method of claim 1, further comprising:
    receiving a user selection associated with the first stub file to access the data file;
    determining whether a third user associated with the user selection has permission to access the data file;
    in the event that the third user has permission to access the data file, executing a virtual application corresponding to the data file; and
    providing access to the data file at the designated virtual storage area using the virtual application.

7. The method of claim 1, further comprising:
    receiving a user selection associated with the first stub file to access the data file;
    determining whether a third user associated with the user selection has permission to access the data file;
    in the event that the third user has permission to access the data file, executing a virtual application corresponding to the data file; and
    providing access to the data file at the designated virtual storage area using the virtual application including by:
        transmitting information included in the first stub file to a cloud server associated with the designated virtual storage area; and
        receiving a user interface associated with a document editor program from the cloud server.

8. The method of claim 1, further comprising:
    receiving a user selection associated with the first stub file to access the data file;
    determining whether a third user associated with the user selection has permission to access the data file;
    in the event that the third user has permission to access the data file, executing a virtual application corresponding to the data file; and
    providing access to the data file at the designated virtual storage area using the virtual application including by:
        transmitting information included in the first stub file to a cloud server associated with the designated virtual storage area;
        receiving a user interface associated with a document editor program from the cloud server;
        receiving an operation to be performed on the data file via the user interface; and
        sending the operation to the cloud server.

9. A computer program product, the computer program product comprising a non-transitory computer readable storage medium and comprising computer instructions for:
    in response to an indication that a data file has been generated by a first client device, determining a security classification associated with the data file;
    determining that the security classification associated with the data file comprises a classified file;
    storing the data file in a designated virtual storage area;
    generating a first stub file at an original storage location of the data file, wherein the first stub file includes a viewing permission associated with the data file and a storage location of the data file in the designated virtual storage area;
    receiving a first instruction from a first user to share the data file with a second user;
    determining user information associated with the second user;
    determining that the second user has permission to access the data file based at least in part on the user information associated with the second user; and sending a second instruction to a second client device associated with the second user, wherein the second instruction is configured to generate a second stub file corresponding to the data file at the second client device associated with the second user, wherein the second stub file is configured to be usable to obtain the data file in the designated virtual storage area.

10. The computer program product of claim 9, wherein the designated virtual storage area is associated with a cloud server.

11. The computer program product of claim 9, wherein determining the security classification associated with the data file comprises:
   comparing content information associated with the data file against a preset condition; and
   determining the security classification based at least in part on a result of the comparison.

12. The computer program product of claim 9, wherein the security classification associated with the data file is set by a third user.

13. The computer program product of claim 9, further comprising storing the first stub file at the original storage location associated with the data file.

14. The computer program product of claim 9, further comprising:
   receiving a user selection associated with the first stub file to access the data file;
   determining whether a third user associated with the user selection has permission to access the data file;
   in the event that the third user has permission to access the data file, executing a virtual application corresponding to the data file; and
   providing access to the data file at the designated virtual storage area using the virtual application.

15. The computer program product of claim 9, further comprising:
   receiving a user selection associated with the first stub file to access the data file;
   determining whether a third user associated with the user selection has permission to access the data file;
   in the event that the third user has permission to access the data file, executing a virtual application corresponding to the data file; and
   providing access to the data file at the designated virtual storage area using the virtual application including by:
      transmitting information included in the first stub file to a cloud server associated with the designated virtual storage area; and
      receiving a user interface associated with a document editor program from the cloud server.

16. The computer program product of claim 9, further comprising:
   receiving a user selection associated with the first stub file to access the data file;
   determining whether a third user associated with the user selection has permission to access the data file;
   in the event that the third user has permission to access the data file, executing a virtual application corresponding to the data file; and
   providing access to the data file at the designated virtual storage area using the virtual application including by:
      transmitting information included in the first stub file to a cloud server associated with the designated virtual storage area;
      receiving a user interface associated with a document editor program from the cloud server;
      receiving an operation to be performed on the data file via the user interface; and
      sending the operation to the cloud server.

17. A system, comprising:
   one or more processors configured to:
      in response to an indication that a data file has been generated by a first client device, determine a security classification associated with the data file;
      determine that the security classification associated with the data file comprises a classified file;
      store the data file in a designated virtual storage area;
      generate a first stub file at an original storage location of the data file, wherein the first stub file includes a viewing permission associated with the data file and a storage location of the data file in the designated virtual storage area;
      receive a first instruction from a first user to share the data file with a second user;
      determine user information associated with the second user;
      determine that the second user has permission to access the data file based at least in part on the user information associated with the second user; and
      send a second instruction to a second client device associated with the second user, wherein the second instruction is configured to generate a second stub file corresponding to the data file at the second client device associated with the second user, wherein the second stub file is configured to be usable to obtain the data file in the designated virtual storage area; and
   one or more memories coupled to the one or more processors and configured to provide instructions to the one or more processors.

18. The system of claim 17, wherein the designated virtual storage area is associated with a cloud server.

* * * * *